United States Patent [19]
Taylor

[11] 4,262,786
[45] Apr. 21, 1981

[54] DRIVE COUPLING

[75] Inventor: Wayne H. Taylor, Mount Prospect, Ill.

[73] Assignee: Borg-Warner Corporation, Chicago, Ill.

[21] Appl. No.: 971,281

[22] Filed: Dec. 20, 1978

[51] Int. Cl.³ .................................... F16D 13/04
[52] U.S. Cl. .................... 192/46; 192/48.92; 192/76
[58] Field of Search ............... 192/46, 76, 75, 71, 192/48.92

[56] References Cited

U.S. PATENT DOCUMENTS

| 70,059 | 10/1867 | Wilber | 192/46 |
|---|---|---|---|
| 1,900,957 | 3/1933 | Stanley et al. | 192/46 |
| 2,054,747 | 9/1936 | Green et al. | 192/46 X |
| 2,224,322 | 12/1940 | Sinclair | 192/48.92 X |
| 2,678,708 | 5/1954 | Schill | 192/46 |
| 2,735,526 | 2/1956 | Gemmel | 192/46 X |
| 2,818,950 | 1/1958 | Harless | 192/46 X |
| 3,256,966 | 6/1966 | Angquist | 192/46 |
| 3,300,003 | 1/1967 | Peterson et al. | 192/46 |
| 3,486,597 | 12/1969 | Carlton | 192/46 |
| 3,620,337 | 11/1971 | Fluck | 192/46 |
| 3,729,076 | 4/1973 | de Lavalette | 192/41 A |
| 3,750,783 | 8/1973 | Ohtsuka et al. | 192/48.92 X |
| 3,854,561 | 12/1974 | Conde | 192/48.92 |
| 3,952,849 | 4/1976 | Brownhill et al. | 192/41 A |
| 4,061,216 | 12/1977 | Sullivan et al. | 192/46 |
| 4,083,419 | 4/1978 | Fogelberg | 192/48.92 X |
| 4,111,288 | 9/1978 | Fogelberg | 192/48.92 X |

Primary Examiner—George H. Krizmanich
Assistant Examiner—Moshe I. Cohen
Attorney, Agent, or Firm—Aubrey L. Burgess

[57] ABSTRACT

A drive coupling for selectively disengaging a driving shaft and a driven shaft upon rotation of the driving shaft in one direction. The coupling comprises a pair of one-way clutches and a one space ratchet means so arranged to couple the shafts when the driving shaft is rotating in the normal direction and to uncouple the shafts upon the opposite rotation of the driving shaft. The coupling device is capable of remote operation as by reversing the current flow to the motor.

Such a device provides a convenient means for coupling and uncoupling pump stages in a submersible pump thus permitting adjustment of the performance of the pump by the addition or subtraction of pump stages without pulling the entire assembly from the well.

6 Claims, 5 Drawing Figures

DRIVE COUPLING

BACKGROUND OF THE INVENTION

A submersible pump especially for use in deep wells, either water or oil, generally comprises an electric motor and a plurality of pump stages, the motor being lowermost and separated from the pump stages by a seal section to substantially prevent well fluid leakage into the motor. At times, there are a hundred or more pump stages and the electric motor may be some thirty feet in length with a diameter of approximately six inches. In order to change the pumping performance, pump stages can be added or subtracted from the assembly, generally requiring pulling the assembly from the well. This is not only time consuming and costly but is also inconvenient.

THE DRAWINGS

THE INVENTION

A drive coupling adapted for use in a submersible pump assembly or other assemblies where parts are drivingly connected for selectively connecting and disconnecting a driving shaft and a driven shaft which can be remotely operated is herein disclosed. Disconnecting the shafts is accomplished by momentarily reversing the direction of rotation of the driving shafts, as by reversing the direction of rotation of the rotor of an electric motor. When used in a submersible pump assembly, the number of pump stages or groups of stages can be changed to modify the performance of the pump assembly or pump stages can be repaired and/or replaced without removing the entire string of stages from a well.

The drive coupling of this invention comprises a first coupling clutch means having a plurality of spring loaded rotatable driving fingers pivotably mounted on the driving shaft and each engaging a slot in a pawl which pawl in turn engages a notch on the driven shaft to thus drivingly connect the shafts. The pawls are pivoted on an annular member which rotates with the shafts when the latter are coupled. Associated with the member are a plurality of notches engageable by spring loaded one-space ratchet means pivoted on the driving shaft. A one-way clutch is associated with the annular member and overrides when the shafts are coupled and rotating in a normal direction.

When the direction of rotation of the driving shaft is momentarily reversed, the one-space ratchet allows the shaft to turn back only enough to allow the driving fingers to move into another slot in the pawls. When the motor shaft is then returned to its forward direction, the fingers push against the pawls but, because the fingers engage different slots, the pawls swivel out of engagement with the teeth. The shafts are then uncoupled.

To again couple the shafts, the direction of rotation of the driving shafts is again momentarily reversed, the fingers move into the other slots in the pawls so that when the driving shaft is rotated in the normal forward direction, the pawls engage the teeth of the driven shaft and the shafts are again coupled.

DETAILED DESCRIPTION

Figure 1:
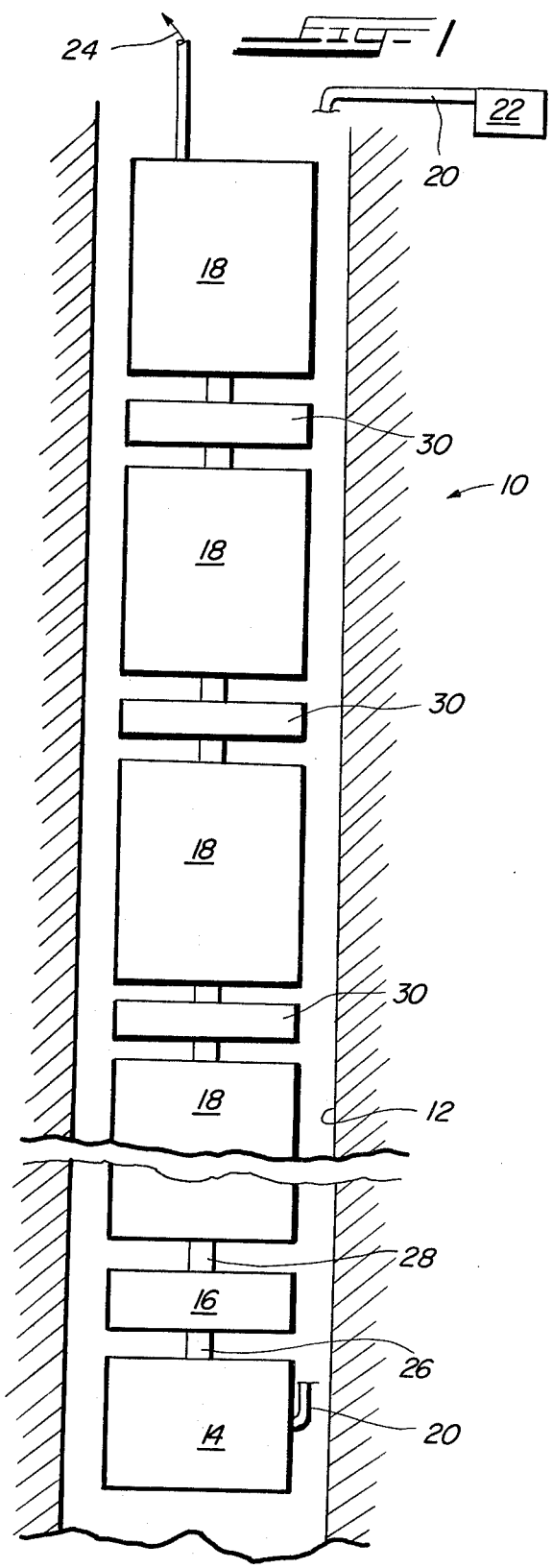
FIG. 1 is a schematic illustration of a submersible pump assembly showing the location of the drive coupling of this invention.

FIG. 1 of the drawings illustrates schematically the usual arrangement of a submersible pump assembly or string 10 in a well casing 12. The pump assembly 10 comprises an electric motor 14, a seal section 16 and pumping sections 18. The motor is energized by an electric cable schematically illustrated at 20 and controlled from a control panel 22. The pumping sections 18 generally comprise one or more pumping stages, each comprising one or more diffusers and alternating impellers (not illustrated), the construction of which is conventional. The pumping section discharges at 24.

For purposes of describing the invention, the driving shaft is the motor shaft 26 while the driven shaft is the shaft 28, it being understood that the driving and driven shafts between each pump stage depends on its location in the string. Couplings 30 according to this invention are located in the assembly between the pumping sections 18 as shown.

Figure 2:
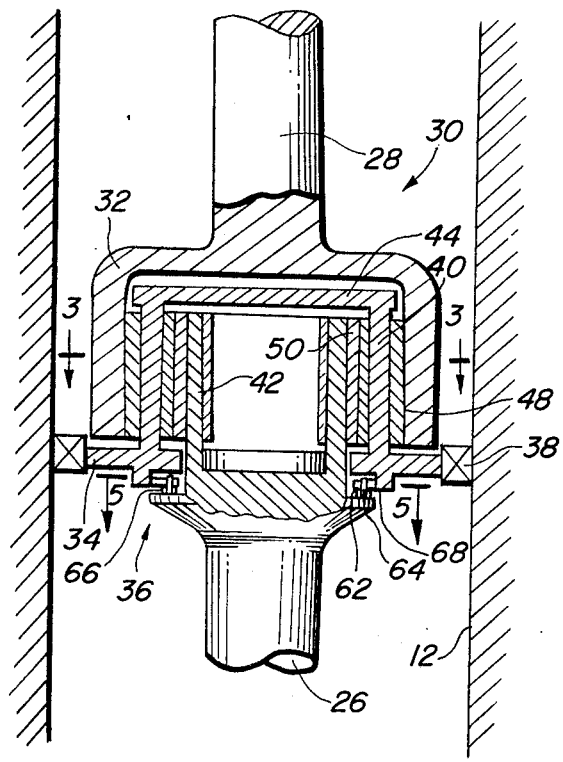
FIG. 2 is a partial, longitudinal sectional view of the drive coupling of this invention.
Figure 3:
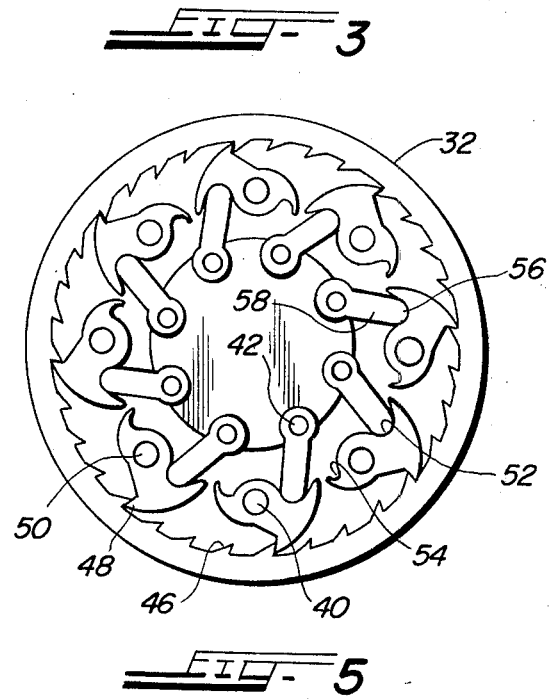
FIG. 3 is a sectional view taken on line 3—3 of FIG. 2.
Figure 5:
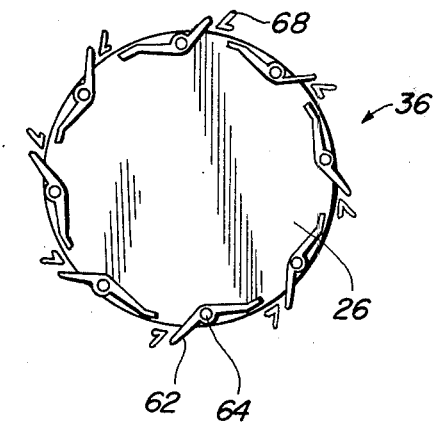
FIG. 5 is an enlarged sectional view on line 5—5 of FIG. 2.
Figure 4:
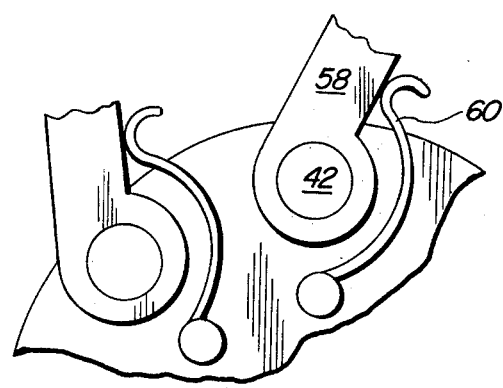
FIG. 4 is an enlarged partial view of the spring loaded clutch fingers shown in FIG. 3.

The couplings 30 of this invention are illustrated in detail in FIGS. 2, 3 and 4, to which attention is invited. The couplings 30 comprise the driving shaft 26 and the driven shaft 28, the latter having an enlarged bell-shaped end 32. A generally annular plate 34 is coupled to the driving shaft 26 by a one-space ratchet means 36 to be later described. A one-way clutch 38 (illustrated schematically) is positioned between the periphery of the plate 34 and the well casing 12 or other stationary member such as a sleeve and the like.

The plate 34 has a plurality of axially directed pivot members 40, while the shaft 26 has a plurality of pivot members 42, the members 40 being arranged in a circular array of one diameter and connected by a top plate 44, while the members 42 are arranged in a circular array of lesser diameter.

The interior of the bell 32 is machined or cast with a plurality of axially aligned teeth or notches 46, some of which are engaged by projections 48 of pawls 50 pivotably supported on pivots 40. Each pawl 50 is shaped at the inner side to have a pair of finger receiving spaces 52, 54 each adapted to receive the end 56 of a finger 58 pivoted on the pivots 42 and each spring loaded by means of a spring 60 to be urged in one direction, i.e., counterclockwise as viewed in the drawing.

The driving connection between the shafts 26 and 28 is complete when the pawls 50 are as illustrated in FIG. 3.

The ratchet means 36 comprises a plurality of wing-like pivotable means 62 pivoted on pivot members 64 circularly arranged on the driving shaft 26, the wing-like means 62 being spring loaded by springs 66 as illustrated. The plate 34 is provided with lugs 68 to cooperate with the means 62 to limit relative rotational movement between the shafts 26 and 28 to one space when the driving shaft is rotated in a direction opposite to the normal direction of rotation to initiate uncoupling of the shafts 26, 28, as will be explained.

OPERATION

With the driving shaft 26 rotating in the normal direction, the ends 56 of the spring loaded fingers 58 of the pawls 50 are located in the slots 52 such that the projections 48 of the pawls 50 engage the teeth 46 of the bell 32 to drivingly connect the driving and driven shafts 26 and 28, respectively. At this time, the ratchet means 36 and wing-like means 62 engage the lugs 68. The one-way clutch 38 is in overrunning mode.

Upon momentary reversal of the direction of rotation of the driving shaft 26, the ratchet means 36 permits the shaft to turn "one space", i.e., the members 62 pivot and the opposite ends engage the lugs 68. At the same time, the one-way clutch 38 engages the plate 34 against rotation. The fingers 58 move with the shaft 26 and then pivot such that the ends 56 slide into spaces or slots 54, disengaging the projections 48 from the teeth 46.

The shafts are now uncoupled permitting withdrawal of the elements of the pump and its connected parts above the coupling. The shafts remain uncoupled upon return to the normal direction of rotation. Upon again momentarily reversing the direction of rotation, the ratchet means 36 permits a one space turn of the shaft 26 and the fingers 62 again engage the lugs 68 while the fingers 58 move and again engage the slots 52 such that the projections 48 of the pawls 50 engage the teeth 46. When the direction of rotation is again returned to normal, the shafts are coupled. The ratchet means 36 returns to its illustrated position, the one-way clutch overruns permitting the plate to rotate so that the pawls engage the teeth 40.

I claim:

1. In a device for coupling and uncoupling a driving shaft and a driven shaft activated only by changes in the direction of rotation of the driving shaft, the improvement comprising:
   means to rotate said driving shaft;
   notches in a portion of said driven shaft;
   a first clutch comprising pivotable pawls supported between said driving and driven shafts and having projections engaging said notches and pivotable fingers connected to said driving shaft engaging said pawls to maintain said pawls in engagement with said notches when the driving shaft is rotating in one direction thus providing a driving connection between said shafts;
   means permitting said pawls to pivot such that said projections are free of engagement with said notches when said driving shaft is rotated in the other direction; and
   recess means in said pawls engagable by said pivotable finger to maintain said projections free of engagement with said notches until said driving shaft is again rotated in said one direction.

2. In a device as recited in claim 1 further comprising a ratchet means operatively associated with said driving shaft and said first clutch means limiting the reverse direction of rotation of said driving shaft permitting said fingers to engage said recess means.

3. In a device as recited in claim 1 further comprising a one-way clutch operatively associated with said pivotable pawls for restraining movement of said pawls with said driving shaft when said driving shaft is rotated in said other direction.

4. In a device for coupling and uncoupling submersible pump stages of a string of stages driven by a submersible motor when in a well with the motor being lowermost in the assembly and with driving and driven shafts, the device being so located to be associated with a driving shaft and driven shaft, the coupling and uncoupling depending only on the direction of rotation of the driving shaft, the improvement which comprises:
   a bell-like end on said driven shaft having notches on its inner periphery;
   an annular member located between said shafts and supporting pivotable pawls each adapted to engage a notch of the inner periphery of the bell-like end when the driving shaft is rotating in one direction;
   means associated with said driving shaft engaging said pawls;
   said pawls and said means engaging said pawls providing a driving connection between the driving and driven shafts when said driving shaft is rotating in said one direction, and
   ratchet means operatively associated with said annular member and said driving shaft allowing limited rotation of the driving shaft in the opposite direction and permitting disengagement of said pawls from said notches upon rotation of said driving shaft in said opposite direction.

5. In a device as recited in claim 4 further comprising a one-way clutch operatively associated with said pivotable pawls for restraining rotation of said annular member when the driving shaft is rotated in the opposite direction insuring disengagement of said pawls and said notches.

6. In a device as recited in claim 5, said means associated with said driving shaft comprising pivotable fingers connected to said driving shaft and engaging said pawls and maintaining engagement of said pawls and said notches when the driving shaft is rotating in said one direction and disengagement of said pawls and said notches after rotation of the driving shaft in the opposite direction.

* * * * *